Feb. 23, 1965  A. YARIV  3,171,031
OPTICAL MASER MODULATORS

Filed July 31, 1961  2 Sheets-Sheet 1

INVENTOR
A. YARIV
BY
*David P. Kelley*
ATTORNEY

Feb. 23, 1965  A. YARIV  3,171,031
OPTICAL MASER MODULATORS
Filed July 31, 1961  2 Sheets-Sheet 2

INVENTOR
A. YARIV
BY
ATTORNEY

United States Patent Office 3,171,031
Patented Feb. 23, 1965

3,171,031
OPTICAL MASER MODULATORS
Amnon Yariv, Chatham, N.J., assignor to Bell Telephone Laboratories, Incorporated, New York, N.Y., a corporation of New York
Filed July 31, 1961, Ser. No. 128,161
7 Claims. (Cl. 250—199)

This invention relates to optical masers and more particularly to the modulation of coherent light wave energy produced by stimulated emission from maser-type devices.

It is characteristic of a maser that it employs a medium in which there is established at least intermittently a nonequilibrium population distribution between a pair of discrete electronic energy levels of its energy level system. More particularly, while under normal equilibrium conditions the population of a lower energy level is greater than that of a higher energy level, maser action is achieved by inverting the population distribution between selected levels. A medium in which the population of a higher level exceeds that of a lower level is now customarily said to exhibit a negative temperature. The period during which such a non-equilibrium condition persists in the absence of the inversion-producing influence is known as the relaxation time, and the process by which the population distribution returns to equilibrium is called relaxation.

A population inversion may be produced in an appropriate medium between a lower energy level $E_1$ and a higher level $E_2$ by applying thereto wave energy of sufficient intensity and having a frequency which satisfies Bohr's relation $$\nu = \frac{E_2 - E_1}{h}$$

where $h$ is Planck's constant.

As is well known, relaxation is accompanied by the emission of wave energy of frequency $\nu$, maser devices being dependent upon the fact that the return transition to equilibrium may be stimulated by the application of a low intensity signal of the same frequency. Because the stimulated emission is in phase with the stimulating signal, masers may be used to amplify weak signals of the frequency corresponding to the separation between a pair of discrete energy levels characterized by an inverted population distribution or, by taking advantage of the phenomenon of spontaneous emission, they may be used as oscillators or generators.

Amplifiers and oscillators employing atomic or molecular resonance phenomena, as do masers, are capable of operation at frequencies far above the frequencies achieved by devices utilizing ordinary electron transit phenomena. Masers of the type disclosed in United States Patent 2,929,922 to Schawlow and Townes are operable at frequencies extending up to and beyond the frequencies of visible light. As is well known, coherent wave energy may be used to carry information in communications systems, the amount of information which may be carried by a wave train being directly related to its frequency. In order to make use of the ability of optical frequency coherent electromagnetic radiation to transmit large quantities of information it is necessary to provide means for modulating the emitted beams at very high frequencies.

It has been proposed in the past to modulate maser emission by applying to the negative temperature medium a unidirectional magnetic or electric modulating field of variable intensity, thereby causing a variable spreading of the spectral lines representing the energy level system thereof. As such techniques involve the variation of fields of apprciable intensity extending over relatively large volumes, high frequency modulation requires a large amount of energy. It is desirable, therefore, to provide alternative means for modulating the output of devices such as the optical maser.

Thus, it is an object of this invention to modulate the amplitude of coherent light wave energy emitted from negative temperature media.

Another object of this invention is to modulate the amplitude of maser emission by controlling directly the magnitude of the population inversion between the appropriate energy levels in the negative temperature medium.

It is a further object of the invention to modulate the amplitude of a coherent monochromatic light beam by variable absorbing means which do not require the use of light polarizers and analyzers.

These and other objects of the invention are achieved in one specific illustrative embodiment thereof comprising a medium having at least three distinct energy levels of its energy level system. Two of the energy levels have a separation corresponding to the frequency of the wave energy to be modulated, so that the medium will either absorb or amplify wave energy of that frequency depending upon whether it is in a positive or negative temperature state. A third energy level of the medium is separated from one of the other levels by an amount corresponding to some convenient modulating frequency which is advantageously somewhat lower than the signal frequency.

It is a feature of the invention that amplitude modulation of a signal generated or amplified by means of a negative temperature in a medium characterized by at least three such energy levels is achieved by applying to the medium modulated wave energy having a frequency corresponding to the separation between one of the energy levels comprising the signal pair and a third level, thereby modulating directly the magnitude of the temperature inversion produced.

It is a further feature of the invention that the amplitude modulation of a signal generated or amplified by means of a three-level negative temperature medium is achieved by applying to the medium modulated wave energy of a frequency corresponding to the separation between one of the energy levels comprising the signal pair, and a fourth energy level distinct therefrom.

Another feature of the invention is the amplitude modulation of the light beam produced by a device such as an optical maser by passing it through a medium characterized by three distinct energy levels two of which have a separation corresponding to the frequency of the light waves, and applying to the medium modulated wave energy having a frequency corresponding to the separation between one level of the signal pair and the third level.

The above-mentioned and other objects and features of the invention will be more thoroughly understood from the following discussion taken in conjunction with the accompanying drawing in which.

Figure 1:
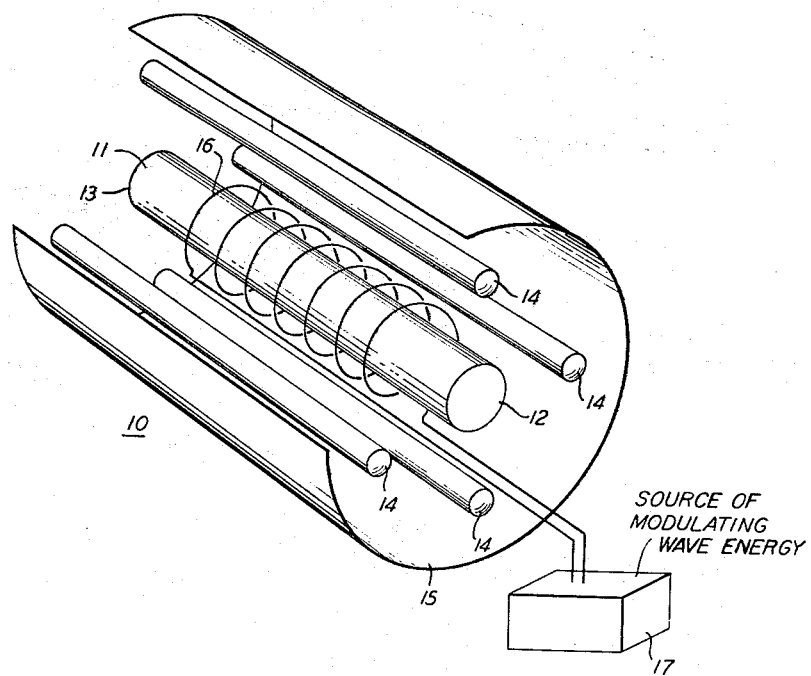
FIGS. 1 and 2 depict illustrative modulatable optical masers embodying the principles of the invention.

Referring now to the drawing there is shown in FIG. 1 a modulatable opitcal maser 10 in accordance with the principles of the invention, comprising a negative temperature medium 11 which has an energy level system characterized by at least three distinct electron energy levels. Typically, the medium 11 is a paramagnetic crystalline solid such as ruby. In the embodiment depicted, the solid member 11 has its end surfaces 12 and 13 ground optically flat and substantially parallel. Additionally, the surfaces 12 and 13 are provided with a reflective coating, thereby forming in the member 11 an optical cavity for promoting maser action. At least one of the surfaces 12 and 13 includes a transmissive or partially reflective portion for abstracting optical frequency wave energy from the cavity formed thereby. A plurality of lamps 14 are disposed around the rod 11 for providing optical frequency pump energy to the energy level system thereof. Advantageously, a reflective member 15 surrounds the lamps 14 and the rod 11 to facilitate coupling the optical pump energy to the negative temperature medium 11. A helical wave-propagating circuit 16 is wound around the rod 11, for applying thereto modulated wave energy in the microwave range. The modulated microwave energy, supplied by a modulating source 17, modulates the magnitude of the population inversion between appropriate energy levels in the negative temperature medium 11.

Figure 2:
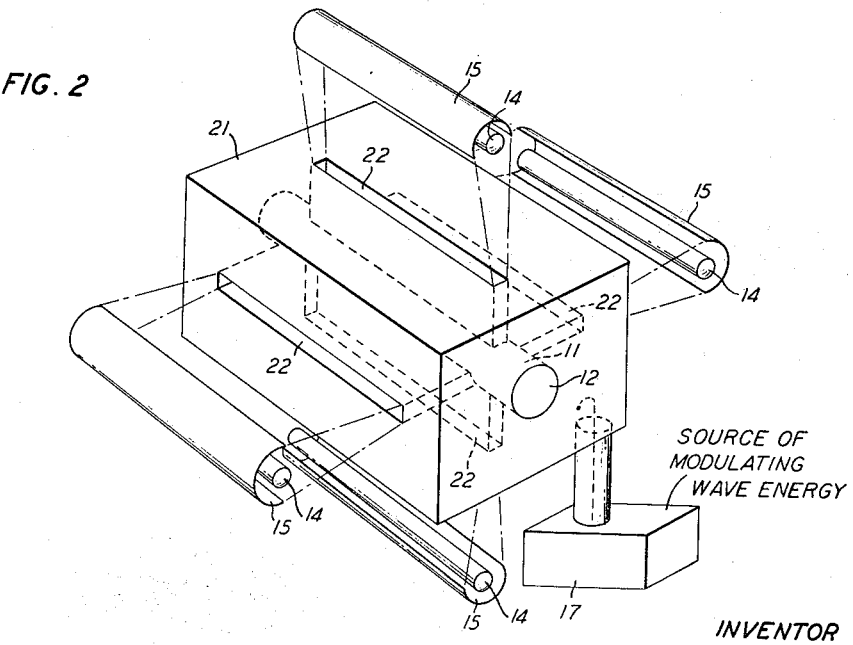

It will be appreciated that the helix 16 must be a relatively open structure, so as to permit a maximum amount of the optical pump energy from lamps 14 to penetrate the rod 11. In some circumstances it will be convenient to utilize other types of structures to apply the modulating wave energy to the negative temperature medium. An alternative is illustrated in FIG. 2, wherein the rod 11 is enclosed in a microwave cavity 21, optical frequency pump energy being applied thereto by means of lamps 14 and reflectors 15. Pump energy is admitted into the cavity 21 through appropriately placed openings 22 in the conductive walls thereof.

Figure 4:
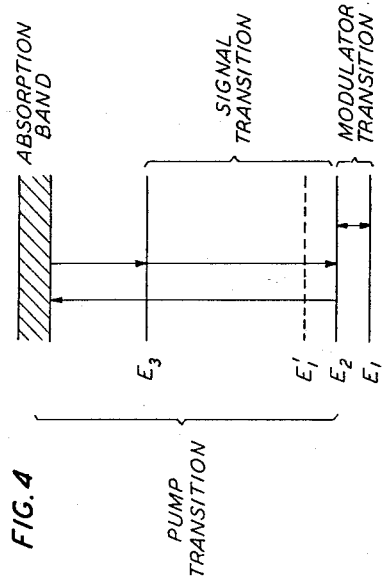
FIGS. 3 and 4 illustrate in diagrammatic form energy level systems of negative temperature media of a type suitable for use in the invention.
Figure 3:
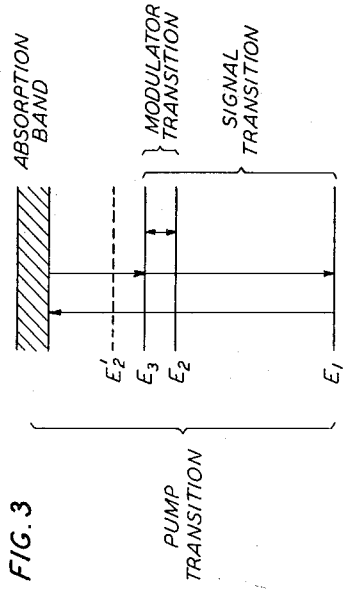

The operation of modulatable optical masers of the type shown in FIGS. 1 and 2 may be understood by referring to FIGS. 3 and 4 which illustrate in schematic form the energy level structures of two negative temperature media employable in the invention. In a maser comprising a negative temperature medium having at least three distinct electron energy levels as shown in FIG. 3, it is known to achieve continuous operation by applying to the medium pump wave energy at a frequency $\nu_p$ corresponding to the difference between the ground state $E_1$ and an absorption band of the material. By means of absorption and spontaneous relaxation the pumping process increases the electron population of level $E_3$ and decreases the population of level $E_1$. Relaxation between the absorption band and $E_1$ proceeds in two steps by way of level $E_3$. Thus, if the relaxation time between the absorption band and $E_3$ is less than the relaxation time $T_{31}$, a population inversion is eventually produced between levels $E_3$ and $E_1$ and amplification by stimulated emission may be achieved at frequency $\nu_{31}$.

The amplitude of the signal emitted by a maser medium in a negative temperature state varies directly with the magnitude of the population inversion. Hence, in accordance with the invention, modulation is achieved by applying to the medium modulated wave energy at frequency $\nu_{32}$. When the amplitude of the modulating wave increases, the population of level $E_3$ is increased at the expense of the population of level $E_2$, thereby increasing the magnitude of the inversion between $E_1$ and $E_3$. Conversely, when the amplitude of the modulating wave decreases, the population of level $E_2$ increases due to relaxation from the absorption band, which is kept relatively overpopulated by the pump wave. Although in FIG. 3 the auxiliary energy level $E_2$ is shown below level $E_3$, the maser output may be modulated in similar fashion when the negative temperature medium has an auxiliary level above the upper level of the signal pair. Such a configuration is indicated by level $E_2'$ in FIG. 3.

The energy level system of a maser medium having an alternative arrangement of electron energy levels is depicted in FIG. 4. The principle of the invention as described above is applicable here as well, for by applying to the medium modulated wave energy at frequency $\nu_{21}$ the population of the level $E_2$ may be varied, thereby varying the magnitude of the population inversion between the levels corresponding to the signal transition. Although in FIG. 4 the energy level $E_1$ is lower than the level $E_2$, it will be apparent that the magnitude of the population inversion may be modulated by means of an auxiliary energy level which is either higher or lower than one of the levels of the signal pair. Another possible auxiliary energy level configuration is indicated by the dashed line for level $E_1'$.

Figure 5:
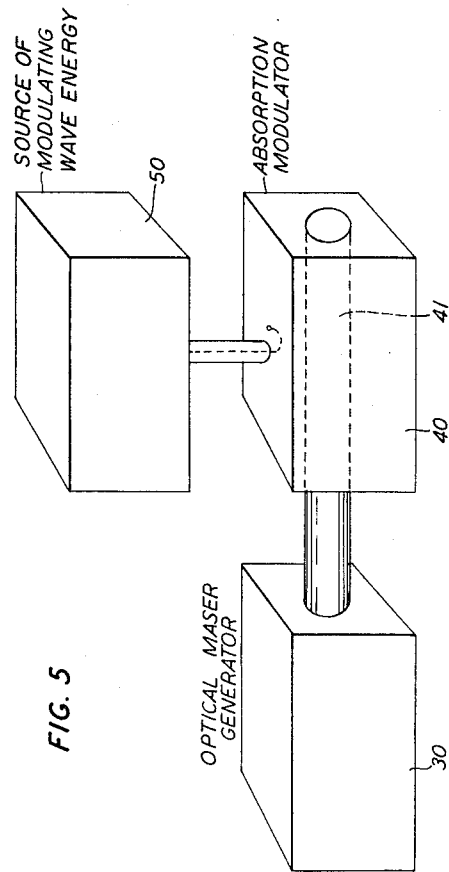
FIG. 5 depicts a variation of the invention in which the negative temperature medium is separate from the modulating medium.

While in some circumstances it will be convenient to modulate the maser output by modulating directly the magnitude of the population inversion between the energy levels of the signal pair, there may be occasions in which it is preferable to modulate the output of a maser of the more usual type. The principle of the invention may also be employed to provide a light amplitude modulator of the absorption type. Such an arrangement is illustrated in FIG. 5, wherein there is shown an optical maser generator 30 the output beam of which is directed into an absorption modulating cell 40. In accordance with the invention the cell 40 comprises a modulating medium 41 having at least three distinct electron energy levels two of which have a separation corresponding to the frequency of the optical maser beam to be modulated. The third energy level of the medium 41 is separated from one level of the signal pair by a convenient modulating frequency.

In operation of the system illustrated in FIG. 5 the maser beam is directed into the modulating medium 41 where a portion of its energy is absorbed by the corresponding energy level transition. The degree of absorption depends on the relative populations of the two energy levels comprising the signal pair. Modulation is achieved by applying to the medium 41 modulated wave energy having a frequency corresponding to the separation between one level of the signal pair and an auxiliary level, thereby modulating directly the population distribution therebetween and hence the degree of absorption.

It can be seen from this specification that the invention provides a means for modulating the amplitude of coherent light waves generated by an optical maser. Although the invention has been described with particular reference to specific embodiments it is not limited thereto. Many variations and modifications may be made by those skilled in the art to which it pertains without departing from its spirit and scope. For example, the absorption band in the energy level structure of the modulating medium may be so narrow as to constitute a distinct energy level, in which case it may also be utilized as the auxiliary level.

What is claimed is:

1. Apparatus for producing modulated electromagnetic radiation by maser action comprising a negative temperature medium characterized by at least three distinct electron energy levels, a pair of which have a separation corresponding to the signal frequency to be produced, means for applying to said medium pump wave energy at a first frequency to produce therein a population inversion between said pair of energy levels whereby stimulation emission is produced at the signal frequency, means for applying to said medium modulated wave energy at a second frequency corresponding to the separation between a first level of said pair of energy levels and a third level to modulate the population inversion between said pair of levels, said wave energy being effective to excite particles from said first level to said third level where the third level is of higher energy than the first and from said third level to said first level where the first level is of higher energy than the third whereby the amplitude of the stimulated emission is modulated, and means for abstracting for utilization modulated output energy at the frequency corresponding to the separation between said pair of levels.

2. Apparatus as in claim 1 wherein said negative temperature medium is further characterized by a relatively long relaxation time between said pair of energy levels and a relatively short relaxation time between said first level of said pair and said third level.

3. Apparatus as in claim 2 wherein the separation between said pair of energy levels corresponds to a frequency in the optical range and the separation between said first level of said pair and said third level corresponds to a frequency in the microwave range.

4. Apparatus for producing modulated electromagnetic radiation by maser action comprising a negative temperature medium characterized by first, second and third successively higher electron energy levels, means for applying to said medium pump wave energy at a frequency corresponding to the separation between said first and third energy levels whereby a population inversion is produced between said first and second levels, means for applying to said medium modulated wave energy at a frequency corresponding to the separation between said second and third energy levels, thereby modulating the population inversion produced between said first and second energy levels, and means for abstracting for utilization modulated output energy at the frequency corresponding to the separation of said first and second energy levels.

5. Apparatus as in claim 4 wherein said negative temperature medium is further characterized by a relatively long relaxation time between said first and second energy levels and a relatively short relaxation time between said second and third energy levels.

6. Apparatus for producing modulated electromagnetic radiation by maser action comprising a negative temperature medium characterized by first, second, third and fourth successively higher electron energy levels, means for applying to said medium pump wave energy at a frequency corresponding to the separation between said first and third energy levels for producing a population inversion between said first and second energy levels, means for applying to said medium modulated wave energy at a frequency corresponding to the separation between said third and fourth energy levels, thereby modulating the population inversion between said first and second energy levels, and means for abstracting for utilization modulated output energy at the frequency corresponding to the separation between said first and second energy levels.

7. Apparatus as in claim 6 wherein said negative temperature medium is further characterized by a relatively long relaxation time between said first and second energy levels and a relatively short relaxation time between said third and fourth energy levels.

References Cited in the file of this patent
UNITED STATES PATENTS 2,929,922   Schawlow et al. _____ Mar. 22, 1960
3,013,217   Lewin et al. _____ Dec. 12, 1961

OTHER REFERENCES

Physical Review, vol. 104, No. 2, Oct. 15, 1956, "Proposal for a New Type Solid State Maser," Bloembergen.

Bergmann: "Submillimeter Wave Maser," J. Appl. Phys., vol. 31, No. 2, February 1960, pp. 275–276.

Bloom: "Optical Pumping," Scientific American, vol. 203, No. 4, October 1960, pp. 72–80.